United States Patent
Wu et al.

(10) Patent No.: US 12,085,928 B2
(45) Date of Patent: Sep. 10, 2024

(54) FAULT RISK ANALYSIS SYSTEM AND METHOD, AIR CONDITIONER AND COMPUTER READABLE STORAGE MEDIUM

(71) Applicants: GD MIDEA HEATING & VENTILATING EQUIPMENT CO., LTD., Foshan (CN); MIDEA GROUP CO., LTD., Foshan (CN)

(72) Inventors: Kongxiang Wu, Foshan (CN); Yongfeng Xu, Foshan (CN); Hongwei Li, Foshan (CN); Ruhan Wang, Foshan (CN); Wei Wang, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 443 days.

(21) Appl. No.: 17/604,432

(22) PCT Filed: Mar. 5, 2020

(86) PCT No.: PCT/CN2020/078072
§ 371 (c)(1),
(2) Date: Oct. 17, 2021

(87) PCT Pub. No.: WO2021/017469
PCT Pub. Date: Feb. 4, 2021

(65) Prior Publication Data
US 2022/0214673 A1 Jul. 7, 2022

(30) Foreign Application Priority Data
Jul. 29, 2019 (CN) .......................... 201910686915.5

(51) Int. Cl.
*G05B 23/02* (2006.01)
*F24F 11/63* (2018.01)
*G06Q 10/20* (2023.01)

(52) U.S. Cl.
CPC .......... *G05B 23/0227* (2013.01); *F24F 11/63* (2018.01); *G06Q 10/20* (2013.01)

(58) Field of Classification Search
CPC ...... G05B 23/0227; F24F 11/63; G06Q 10/20
(Continued)

(56) References Cited

U.S. PATENT DOCUMENTS

| 2013/0197698 A1* | 8/2013 | Shah | F24F 11/38 |
| | | | 700/276 |
| 2015/0235141 A1* | 8/2015 | Rensing | G05B 23/0224 |
| | | | 706/52 |

(Continued)

FOREIGN PATENT DOCUMENTS

| CN | 104033992 A | 9/2014 |
| CN | 104930659 A | 9/2015 |

(Continued)

OTHER PUBLICATIONS

Search Report for EP application 20847689.5 mailed Apr. 5, 2022.
(Continued)

*Primary Examiner* — Jigneshkumar C Patel

(57) ABSTRACT

The present application provides a fault risk analysis system, a fault risk analysis method, an air conditioner and a computer readable storage medium, and the fault risk analysis system comprises: a memory for storing computer programs; a processor for executing the computer programs to implement: obtaining debugging information and/or system operation information, and determining fault inducing factors corresponding to the debugging information and/or the system operation information; and adjusting a fault risk level
(Continued)

of the fault category corresponding to the fault inducing factors according to the fault inducing factors. By collecting the debugging information, potential fault inducing factors of the current unit can be accurately reflected; by collecting the system operation information to analyze the fault inducing factors, the fault risk analysis system can obtain more accurate and reliable fault inducing factors.

22 Claims, 7 Drawing Sheets

(58) Field of Classification Search
USPC .......................................................... 700/79
See application file for complete search history.

(56) References Cited

U.S. PATENT DOCUMENTS

| | | | | |
|---|---|---|---|---|
| 2016/0098326 | A1* | 4/2016 | Rebello | G06F 11/3648 |
| | | | | 714/55 |
| 2016/0370023 | A1 | 12/2016 | Stewart et al. | |
| 2016/0370799 | A1 | 12/2016 | Denton et al. | |
| 2019/0128547 | A1* | 5/2019 | Li | G05B 15/02 |
| 2021/0231327 | A1* | 7/2021 | Maslekar | F24F 11/58 |

FOREIGN PATENT DOCUMENTS

| | | |
|---|---|---|
| CN | 104949276 A | 9/2015 |
| CN | 105066322 A | 11/2015 |
| CN | 105138755 A | 12/2015 |
| CN | 105805893 A | 7/2016 |
| CN | 106052023 A | 10/2016 |
| CN | 106196448 A | 12/2016 |
| CN | 105137844 B | 9/2017 |
| CN | 107562034 A | 1/2018 |
| CN | 107990485 A | 5/2018 |
| CN | 109140690 A | 1/2019 |
| CN | 109325603 A | 2/2019 |
| CN | 109344983 A | 2/2019 |
| CN | 109357359 A | 2/2019 |
| CN | 109981309 A | 7/2019 |
| CN | 110388733 A | 10/2019 |
| JP | 2010025475 A | 2/2010 |

OTHER PUBLICATIONS

ISR for PCT application PCT/CN2020/078072.
First OA for CN application No. 201910686915.5.
Second OA for CN application No. 201910686915.5.

* cited by examiner

FAULT RISK ANALYSIS SYSTEM AND METHOD, AIR CONDITIONER AND COMPUTER READABLE STORAGE MEDIUM

CROSS-REFERENCES TO RELATED APPLICATIONS

The present disclosure is a national phase application of International Application No. PCT/CN2020/078072, filed on Mar. 5, 2020, which claims priority to and the benefit of the Chinese Patent Application No. "201910686915.5" filed on Jul. 29, 2019, the entireties of which are herein incorporated by reference.

FIELD

The present disclosure relates to the field of the air-conditioning system technology, particularly to a fault risk analysis system, a fault risk analysis method, an air conditioner and a computer readable storage medium.

BACKGROUND

In general, for an air-conditioning system, particularly a commercial air-conditioning system, the multi-line installation environment is complex and changeable, and the operating conditions are also different. Specific fault analysis often occurs after the unit assembly fails, where a fault code and other fault prompt messages are based for the analysis and subsequent maintenance. This approach will cause a lag in the fault analysis on one hand, and increase a difficulty in maintenance on the other hand.

SUMMARY

The present disclosure aims at solving at least one of the problems existing in the prior art or the related art.

For this, a first aspect of the present disclosure lies in providing a fault risk analysis system.

A second aspect of the present disclosure provides a fault risk analysis method.

A third aspect of the present disclosure provides an air conditioner.

A fourth aspect of the present disclosure provides a computer readable storage medium.

In view of this, the first aspect of the present disclosure provides a fault risk analysis system, including: a memory for storing a computer program; a processor configured to execute the computer program to implement: acquiring debugging information and/or system operation information, and determining a fault inducing factor corresponding to the debugging information and/or the system operation information; and adjusting a fault risk level of a fault category corresponding to the fault inducing factor according to the fault inducing factor.

The fault risk analysis system provided by the present disclosure includes the memory and the processor. The memory is for storing the computer program, and the processor is configured to execute the computer program. The computer program, during processing, acquires device debugging information and/or system operation information; determines a fault inducing factor corresponding to the debugging information and/or the system operation information based on the debugging information and the system operation information; and correspondingly adjusts a fault risk level of a fault category corresponding to the fault inducing factor according to the fault inducing factor determined. Provision of the fault risk analysis system in the unit assembly enables the unit assembly to acquire the debugging information involved in the installation process and the system operation information generated during operation of the unit assembly. As different areas and installation scenarios correspond to different debugging information, collection of the debugging information can accurately reflect the potential fault inducing factor of the current unit assembly, thus achieving fault warning that is accurate to each unit assembly itself. Due to different operation environments and operation statuses of different unit assemblies resulting in system operation information in one-to-one correspondence for each unit assembly, analysis of the fault inducing factor based on collected system operation information can further optimize the process of analyzing the fault inducing factor of the unit assembly on the basis of the analysis of the fault inducing factor based on the debugging information, allowing the fault inducing factor determined by the fault risk analysis system to be more accurate and reliable, as well as applicable to the current unit assembly, thus realizing the embodiment such as optimizing the product fault analysis mechanism, increasing the reliability and accuracy of the fault analysis, improving the warning reliability of the product fault, accurately guiding the user to reduce the occurrence probability of the product fault, and improving the user experience.

In addition, the fault risk analysis system provided in the above embodiment of the present disclosure may further have the following additional technical features.

In the above embodiment, further, the processor is further configured to execute the computer program to implement: adjusting a risk level corresponding to the fault inducing factor corresponding to the debugging information.

In this embodiment, the processor acquires the debugging information of the unit assembly, and correspondingly adjusts the risk level of the fault inducing factor according to the debugging information. After completion of production, the unit assembly will be attached with a default set of risk level ranking of the risk fault inducing factors, which represent induction possibilities that cause the unit assembly to fail. On this basis, the system correspondingly adjusts the risk level corresponding to the fault inducing factor based on the collected debugging information, thus increasing the accuracy and reliability of the risk level corresponding to the fault inducing factor, allowing the adjusted risk level to be more applicable to the current unit assembly, improving the reliability of the fault warning of the unit assembly, and directing the user or serviceman to execute maintenance work more accurately and reliably when the fault occurs in the unit assembly, realizing the embodiment such as optimizing the fault risk analysis system, increasing the product reliability, prolonging the product service life, and improving the user experience.

In any of the above embodiments, further, based on acquiring the system operation information which is system operation information of a present unit assembly, the processor is configured to execute the step of adjusting a fault risk level of a fault category corresponding to the fault inducing factor according to the fault inducing factor by: determining an influencing result of the fault inducing factor on the fault category according to the system operation information of the present unit assembly; and adjusting a risk level corresponding to the fault inducing factor and the fault risk level corresponding to the fault category, respectively, based on the influencing result.

In this embodiment, the system operation information acquired by the fault risk analysis system is system operation information of a present unit assembly. The system operation information of the present unit assembly can accurately reflect the operation status of the present unit assembly. During executing the step of adjusting the fault risk level according to the fault inducing factor, the processor determines an influencing result of the fault inducing factor on the fault category according to the system operation information of the present unit assembly; and correspondingly adjusts a risk level corresponding to the fault inducing factor and the fault risk level corresponding to the fault category according to the influencing result generated by each fault inducing factor. As different operation statuses cause different influences on the unit assembly during operation of the system, analysis of the system operation information of the present unit assembly can accurately determine all possible fault categories that occur in the present unit assembly for each fault inducing factor, and can further analyze the influencing proportion of each fault inducing factor on the fault category, implementing the fault analysis on the actual influence on the unit assembly, to accurately locate the influence of each fault inducing factor on the unit assembly. Besides, corresponding adjustment of the fault risk level corresponding to the fault category based on the influencing result can minimize the adverse effect of the fault on the unit assembly, thus realizing the embodiment such as optimizing the fault risk analysis system, reducing loss caused by the fault, improving the product reliability, and prolonging the product service life.

In any of the above embodiments, further, based on acquiring the system operation information which is system fault information of other unit assembly, the processor is configured to execute the step of adjusting a fault risk level of a fault category corresponding to the fault inducing factor according to the fault inducing factor by: increasing the fault risk level of the fault category corresponding to the fault inducing factor.

In this embodiment, the system operation information acquired by the fault risk analysis system is system fault information of other unit assembly. The system fault information generated by other unit assembly of the same category is of strong reference, which can guide the fault analysis system of the present unit assembly to make a targeted warning. During executing the step of adjusting the fault risk level according to the fault inducing factor, the processor increases the fault risk level of the fault category corresponding to the fault inducing factor according to the acquired system fault information of other unit assembly, to avoid the same fault from occurring in the present unit assembly as that in other unit assembly, thus preventing the same fault from simultaneously occurring in multiple unit assemblies in the same area, further realizing the embodiment such as improving the reliability of the fault risk system, optimizing the fault risk analysis system, shortening the maintenance cost, and prolonging the product service life.

In any of the above embodiments, further, the processor is further configured to execute the computer program to implement: categorizing the fault category according to a category of a component; and classifying the fault risk level corresponding to the fault category, and any fault category corresponds to at least one fault inducing factor.

In this embodiment, the processor categorizes the fault category according to the category of the component; and classifies the fault risk level corresponding to the fault category; and each fault category corresponds to at least one fault inducing factor. As the fault category and the fault possibility corresponding to each component as well as the fault influence are different, classification of the fault risk level corresponding to the fault category based on the collected component information can further improve the reliability and accuracy of the fault risk level in the system, thus realizing the embodiment such as optimizing the fault risk analysis system, improving the accuracy and reliability of the fault risk analysis system, and prolonging the product service life.

In any of the above embodiments, further, the processor is further configured to execute the computer program to implement: ranking a fault risk of the component according to a fault rate of a corresponding component in any category of the component; ranking the fault risk of the component according to a fault rate of a corresponding component in all categories of the component; and ranking the risk level of any fault inducing factor according to an occurrence rate of any fault inducing factor.

In this embodiment, the unit assembly is provided with component categories, each of which corresponds to at least one component. During ranking the fault risk level, the processor ranks the fault risk of the component according to the fault rate of the corresponding component in any category of the component, thus enabling the fault risk analysis system to determine respective fault rates of individual components in this category of the component according to the fault risk ranking of the component, effectively preventing fault caused by a damaged component, and assisting the serviceman to accurately and quickly locate the fault component when the fault occurs. Further, the processor ranks the fault risks of all components according to the fault rate of the corresponding component in all categories of the component, and the fault risk ranking can accurately reflect the possibility of the component inducing the fault, thus enabling the serviceman to accurately locate the fault component with reference to the fault risk ranking during troubleshooting and executing targeted maintenance, further reducing the maintenance difficulty and cost for the unit assembly, thus realizing the embodiment such as optimizing the fault risk analysis system function, increasing the system intelligence degree, improving the system reliability and accuracy, reducing the product maintenance difficulty, and reducing the product maintenance costs.

In any of the above embodiments, further, the processor is further configured to execute the computer program to implement: acquiring the fault category for adjusting the fault risk level; and controlling system operation according to a control strategy corresponding to the fault inducing factor at the highest risk level in all fault inducing factors corresponding to the fault category.

In this embodiment, the fault risk analysis system may further acquire the fault category for adjusting the fault risk level, and controls the system operation according to the control strategy corresponding to the fault inducing factor at the highest risk level in all fault inducing factors corresponding to the fault category. As each fault category corresponds to at least one fault inducing factor, by controlling the unit assembly to execute the strategy operation corresponding to the fault inducing factor at the highest risk level, the fault risk analysis system can minimize the occurrence possibility of such a fault, thus achieving the fault prevention, effectively reducing the fault occurrence probability, thus realizing the embodiment such as optimizing the fault risk analysis system function, improving the system reliability, reducing the product fault rate, and prolonging the product service life.

In any of the above embodiments, further, the processor is further configured to execute the computer program to implement: sending a prompt message based on a real-time system operation parameter of the present unit assembly exceeding a rated threshold range.

In this embodiment, the fault risk analysis system is preset with the rated threshold of the operation parameter matched to the present unit assembly. During operation, the fault risk analysis system acquires the real-time operation parameter of the present unit assembly, and sends a prompt message when the system determines the real-time operation parameter exceeding the rated threshold range, to inform the user or serviceman that the unit assembly is in an unconventional operation status, to warn the user or serviceman of the possibility of the fault occurring in the unit assembly, to prompt the user or serviceman to shut down and check whether the fault occurs in the unit assembly, thus realizing the embodiment such as the intelligent warning of the unit assembly, improving the reliability of the fault risk analysis system, reducing the product fault rate, and improving the user experience.

In any of the above embodiments, further, the processor is further configured to execute the computer program to implement: acquiring current fault information, determining the fault risk level of the fault category corresponding to the current fault information; level-ranking the fault inducing factor corresponding to the fault category corresponding to the current fault information; and sending the fault inducing factor according to the level-ranking.

In this embodiment, the fault risk analysis system acquires the current fault information, and determines the fault risk level of the fault category corresponding to the current fault information; level-ranks the fault inducing factor corresponding to the fault category, and sends the fault inducing factor according to the ranking result. Collection of the fault information can accurately determine the fault category, to assist the serviceman to narrow the troubleshooting range. The system sends the fault inducing factor corresponding to the fault category in a level-ranked form, enabling the user to determine the possibilities of various fault inducing factors by the level-ranking, assisting the user to accurately locate the fault category and the fault inducing factor of the unit assembly, reducing the maintenance difficulty and cost for the unit assembly, thus realizing the embodiment such as optimizing the practicability and reliability of the fault risk analysis system, improving the intellectual degree of the fault risk analysis system, and reducing the product maintenance difficulty.

In any of the above embodiments, further, the fault risk category includes at least one of a compressor-type fault, a fan-type fault, a valve body-type fault, a sensor-type fault, and an electronic control component-type fault; and the fault risk levels corresponding to the sensor-type fault, the electronic control component-type fault, the valve body-type fault, the fan-type fault, and the compressor-type fault rank decreasingly in sequence.

In this embodiment, the fault risk category includes the compressor-type fault, the fan-type fault, the valve body-type fault, the sensor-type fault, and the electronic control component-type fault. The descending order of the above-mentioned multiple fault categories is: the sensor-type fault—the electronic control component-type fault—the valve body-type fault—the fan-type fault—the compressor-type fault. Such a ranking is applicable to most conventional unit assemblies, and can guide the fault risk analysis system to effectively warn the fault of the unit assembly when the unit assembly is running, and accurately evaluate the fault of the unit assembly after the unit assembly fails.

The second aspect of the present disclosure provides a fault risk analysis method, including: acquiring debugging information and/or system operation information, and determining a fault inducing factor corresponding to the debugging information and/or the system operation information; and adjusting a fault risk level of a fault category corresponding to the fault inducing factor according to the fault inducing factor.

The fault risk analysis method provided by the present disclosure acquires device debugging information and/or system operation information; determines a fault inducing factor corresponding to the debugging information and/or the system operation information based on the debugging information and the system operation information; and correspondingly adjusts a fault risk level of a fault category corresponding to the fault inducing factor according to the fault inducing factor determined, thus enabling the unit assembly to acquire the debugging information involved in the installation process and the system operation information generated during operation of the unit assembly. As different areas and installation scenarios correspond to different debugging information, collection of the debugging information can accurately reflect the potential fault inducing factor of the current unit assembly, thus achieving fault warning that is accurate to each unit assembly itself. Due to different operation environments and operation statuses of different unit assemblies resulting in system operation information in one-to-one correspondence for each unit assembly, analysis of the fault inducing factor based on collected system operation information can further optimize the process of analyzing the fault inducing factor of the unit assembly on the basis of the analysis of the fault inducing factor based on the debugging information, allowing the fault inducing factor determined to be more accurate and reliable, as well as applicable to the current unit assembly, thus realizing the embodiment such as optimizing the product fault analysis mechanism, increasing the reliability and accuracy of the fault analysis, improving the warning reliability of the product fault, accurately guiding the user to reduce the occurrence probability of the product fault, and improving the user experience.

In any of the above embodiments, further, the fault risk analysis method further including: adjusting a risk level corresponding to the fault inducing factor corresponding to the debugging information.

In this embodiment, the risk level of the fault inducing factor is correspondingly adjusted according to the debugging information. After completion of production, the unit assembly will be attached with a default set of risk level ranking of the risk fault inducing factors, which represent induction possibilities that cause the unit assembly to fail. On this basis, the risk level corresponding to the fault inducing factor is correspondingly adjusted based on the collected debugging information, thus increasing the accuracy and reliability of the risk level corresponding to the fault inducing factor, allowing the adjusted risk level to be more applicable to the current unit assembly, improving the reliability of the fault warning of the unit assembly, and directing the user or serviceman to execute maintenance work more accurately and reliably when the fault occurs in the unit assembly, realizing the embodiment such as increasing the product reliability, prolonging the product service life, and improving the user experience.

In any of the above embodiments, further, based on acquiring the system operation information which is system operation information of a present unit assembly, the step of adjusting a fault risk level of a fault category corresponding to the fault inducing factor according to the fault inducing factor includes: determining an influencing result of the fault inducing factor on the fault category according to the system operation information of the present unit assembly; and adjusting a risk level corresponding to the fault inducing factor and the fault risk level corresponding to the fault category, respectively, based on the influencing result.

In this embodiment, the system operation information acquired is system operation information of the present unit assembly. The system operation information of the present unit assembly can accurately reflect the operation status of the present unit assembly. During executing the step of adjusting the fault risk level according to the fault inducing factor, the processor determines the influencing result of the fault inducing factor on the fault category according to the system operation information of the present unit assembly; and correspondingly adjusts the risk level corresponding to the fault inducing factor and the fault risk level corresponding to the fault category according to the influencing result generated by each fault inducing factor. As different operation statuses cause different influences on the unit assembly during operation of the system, analysis of the system operation information of the present unit assembly can accurately determine all possible fault categories that occur in the present unit assembly for each fault inducing factor, and can further analyze the influencing proportion of each fault inducing factor on the fault category, implementing the fault analysis on the actual influence on the unit assembly, to accurately locate the influence of each fault inducing factor on the unit assembly. Besides, corresponding adjustment of the fault risk level corresponding to the fault category based on the influencing result can minimize the adverse effect of the fault on the unit assembly, thus realizing the embodiment such as reducing loss caused by the fault, improving the product reliability, and prolonging the product service life.

In any of the above embodiments, further, based on acquiring the system operation information which is system fault information of other unit assembly, the step of adjusting a fault risk level of a fault category corresponding to the fault inducing factor according to the fault inducing factor includes: increasing the fault risk level of the fault category corresponding to the fault inducing factor.

In this embodiment, the system operation information acquired is system fault information of other unit assembly. The system fault information generated by other unit assembly of the same category is of strong reference, which can guide the present unit assembly to make a targeted warning. During executing the step of adjusting the fault risk level according to the fault inducing factor, the processor increases the fault risk level of the fault category corresponding to the fault inducing factor according to the acquired system fault information of other unit assembly, to avoid the same fault from occurring in the present unit assembly as that in other unit assembly, preventing the same fault from simultaneously occurring in multiple unit assemblies in the same area, thus realizing the embodiment such as shortening the maintenance cost, and prolonging the product service life.

In any of the above embodiments, further, the fault risk analysis method further including: categorizing the fault category according to a category of a component; and classifying the fault risk level corresponding to the fault category, and any fault category corresponds to at least one fault inducing factor.

In this embodiment, the fault category is categorized according to the category of the component; and the fault risk level corresponding to the fault category is classified; and each fault category corresponds to at least one fault inducing factor. As the fault category and the fault possibility corresponding to each component as well as the fault influence are different, classification of the fault risk level corresponding to the fault category based on the collected component information can further improve the reliability and accuracy of the fault risk level in the system, thus realizing the embodiment such as improving the accuracy and reliability of the fault risk analysis method, and prolonging the product service life.

In any of the above embodiments, further, the fault risk analysis method further including: ranking a fault risk of the component according to a fault rate of a corresponding component in any category of the component; ranking the fault risk of the component according to a fault rate of a corresponding component in all categories of the component; and ranking the risk level of any fault inducing factor according to an occurrence rate of any fault inducing factor.

In this embodiment, the unit assembly is provided with component categories, each of which corresponds to at least one component. During ranking the fault risk level, the fault risk of the component is ranked according to the fault rate of the corresponding component in any category of the component, thus determining respective fault rates of individual components in this category of the component according to the fault risk ranking of the component, effectively preventing fault caused by a damaged component, and assisting the serviceman to accurately and quickly locate the fault component when the fault occurs. Further, the fault risk of the component is ranked according to the respective fault rates of the all corresponding components in all categories of the component, and the fault risk ranking can accurately reflect the possibility of the component inducing the fault, thus enabling the serviceman to accurately locate the fault component with reference to the fault risk ranking during troubleshooting and executing targeted maintenance, further reducing the maintenance difficulty and cost for the unit assembly, thus realizing the embodiment such as optimizing the fault risk analysis method, increasing the product intelligence degree, improving the product reliability and accuracy, reducing the product maintenance difficulty, and reducing the product maintenance costs.

In any of the above embodiments, further, the fault risk analysis method further including: acquiring the fault category for adjusting the fault risk level; and controlling system operation according to a control strategy corresponding to the fault inducing factor at the highest risk level in all fault inducing factors corresponding to the fault category.

In this embodiment, the fault risk analysis method may acquire the fault category for adjusting the fault risk level, and control the system operation according to the control strategy corresponding to the fault inducing factor at the highest risk level in all fault inducing factors corresponding to the fault category. As each fault category corresponds to at least one fault inducing factor, by controlling the unit assembly to execute the strategy operation corresponding to the fault inducing factor at the highest risk level, the fault risk analysis method can minimize the occurrence possibility of such a fault, achieving the fault prevention, effectively reducing the fault occurrence probability, thus realizing the embodiment such as improving the system reliability, reducing the product fault rate, and prolonging the product service life.

In any of the above embodiments, further, the fault risk analysis method further including: sending a prompt message based on a real-time system operation parameter of the present unit assembly exceeding a rated threshold range.

In this embodiment, the fault risk analysis method is preset with the rated threshold of the operation parameter matched to the present unit assembly. During operation, the operation parameter of the present unit assembly is acquired in real-time, and the prompt message is sent when the real-time operation parameter is determined to exceed the rated threshold range, to inform the user or serviceman that the unit assembly is in an unconventional operation status, to warn the user or serviceman of the possibility of the fault occurring in the unit assembly, to prompt the user or serviceman to shut down and check whether the fault occurs in the unit assembly, thus realizing the embodiment such as the intelligent warning of the unit assembly, improving the product reliability, reducing the product fault rate, and improving the user experience.

In any of the above embodiments, further, the fault risk analysis method further including: acquiring current fault information, determining the fault risk level of the fault category corresponding to the current fault information; level-ranking the fault inducing factor corresponding to the fault category corresponding to the current fault information; and sending the fault inducing factor according to the level-ranking.

In this embodiment, the current fault information is acquired, and the fault risk level of the fault category corresponding to the current fault information is determined; and the fault inducing factor corresponding to the fault category is level-ranked, and the fault inducing factor is sent according to the ranking result. Collection of the fault information can accurately determine the fault category, to assist the serviceman to narrow the troubleshooting range. The fault inducing factor corresponding to the fault category is sent in a level-ranked form, enabling the user to determine the possibilities of various fault inducing factors by the level-ranking, assisting the user to accurately locate the fault category and the fault inducing factor of the unit assembly, reducing the maintenance difficulty and cost for the unit assembly, further realizing the embodiment such as increasing the product reliability, improving the product intellectual degree, and reducing the product maintenance difficulty.

In any of the above embodiments, further, the fault risk category includes at least one of a compressor-type fault, a fan-type fault, a valve body-type fault, a sensor-type fault, and an electronic control component-type fault; and the fault risk levels corresponding to the sensor-type fault, the electronic control component-type fault, the valve body-type fault, the fan-type fault, and the compressor-type fault rank decreasingly in sequence.

In this embodiment, the fault risk category includes the compressor-type fault, the fan-type fault, the valve body-type fault, the sensor-type fault, and the electronic control component-type fault. The descending order of the above-mentioned multiple fault categories is: the sensor-type fault—the electronic control component-type fault—the valve body-type fault—the fan-type fault—the compressor-type fault. Such a ranking is applicable to most conventional unit assemblies, and can guide the unit assembly to effectively warn the fault during operation, and accurately evaluate the fault of the unit assembly after the unit assembly fails.

The third aspect of the present disclosure provides an air conditioner, including the fault risk analysis system as described in any of the above embodiments. Therefore, the air conditioner has all advantages of the fault risk analysis system provided in any of the above embodiments, which will not be repeated hereby.

The fourth aspect of the present disclosure provides a computer readable storage medium having stored therein a computer program that when executed by a processor implements the fault risk analysis method as described in any of the above embodiments. Therefore, the air conditioner has all advantages of the fault risk analysis method provided in any of the above embodiments, which will not be repeated hereby.

The additional aspects and advantages of the present disclosure will become apparent in the following description, or be understood through the practice of the present disclosure.

BRIEF DESCRIPTION OF THE DRAWINGS

The above and/or additional embodiments of the present disclosure will become clear to understand from the description of the embodiments in conjunction with the drawings, in which.

DETAILED DESCRIPTION OF THE DISCLOSURE

Embodiments of the present disclosure will be further described in detail below in conjunction with the drawings and embodiments. It should be noted that the embodiments and the features in the embodiments of the present disclosure can be combined with each other without conflict.

In the following description, many specific details are set forth in order to fully understand the present disclosure. However, the present disclosure can also be implemented in other ways different from those described herein. Therefore, the protection scope of the present disclosure is not limited by embodiments disclosed below.

With reference to FIG. 1 to FIG. 12, a fault risk analysis system, a fault risk analysis method, an air conditioner and a computer readable storage medium are described according to some embodiments of the present disclosure.

Figure 1:
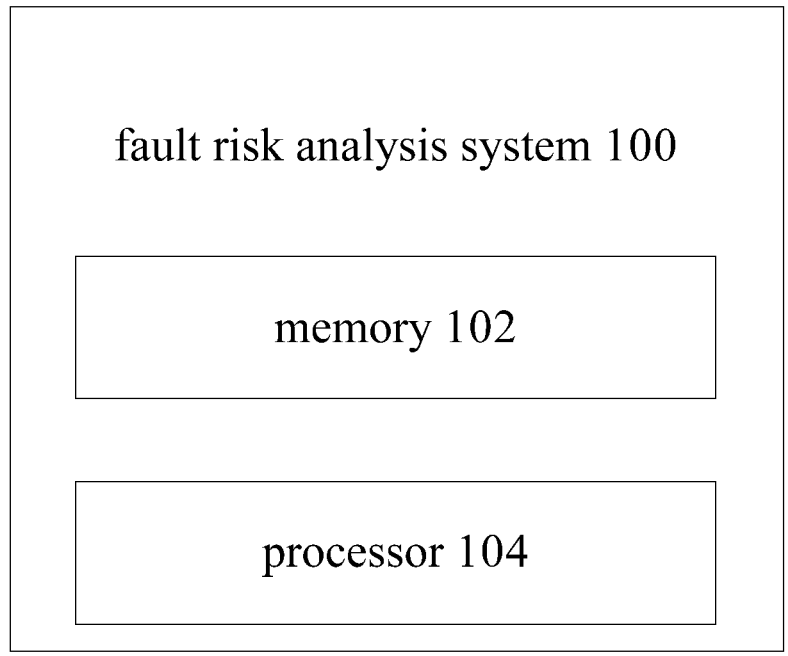
FIG. 1 is a structure block diagram showing a fault risk analysis system according to an embodiment of the present disclosure.

As shown in FIG. 1, the fault risk analysis system 100 includes a memory 102 and a processor 104. The memory 102 is for storing a computer program, by which the fault risk analysis is executed. The processor 104 is configured to execute the computer program.

The processor 104 is configured to execute the computer program to implement: acquiring device debugging information and/or system operation information; and determining a fault inducing factor corresponding to the debugging information and/or the system operation information based on the debugging information and the system operation information; and adjusting a fault risk level of a fault category corresponding to the fault inducing factor according to the determined fault inducing factor.

In one embodiment, the fault risk analysis system defined in the present disclosure is applied in an air conditioner. During installation of the air conditioner, the device debugging information of the air conditioner is input into the fault risk system, the system operation information and the working parameter of the air conditioner are then acquired in real-time during the operation, to determine the potential safety hazard and the fault inducing factor of the air conditioner in advance, and evaluate the fault risk level.

Collection of the debugging information can accurately reflect the potential fault inducing factor of the current unit assembly, thus achieving fault warning that is accurate to each unit assembly itself. Analysis of the fault inducing factor based on the collected system operation information can further optimize the process of analyzing the fault inducing factor of the unit assembly on the basis of analysis of the fault inducing factor based on the debugging information, thus allowing the fault inducing factor determined by the fault risk analysis system 100 to be more acute and reliable, as well as applicable to the current unit assembly, thus realizing the embodiment such as optimizing the product fault analysis mechanism, increasing the reliability and accuracy of the fault analysis, improving the warning reliability of the product fault, accurately guiding the user to reduce the occurrence probability of the product fault, and improving the user experience.

Further, the processor is further configured to execute the computer program to implement: adjusting the risk level corresponding to the fault inducing factor corresponding to the debugging information.

In this embodiment, the processor acquires the debugging information of the unit assembly, and correspondingly adjusts the risk level of the fault inducing factor according to the debugging information. After completion of production, the unit assembly will be attached with a default set of risk level ranking of the risk fault inducing factors, which represent induction possibilities that cause the unit assembly to fail. On this basis, the system correspondingly adjusts the risk level corresponding to the fault inducing factor based on the collected debugging information, thus increasing the accuracy and reliability of the risk level corresponding to the fault inducing factor, allowing the adjusted risk level to be more applicable to the current unit assembly, improving the reliability of the fault warning of the unit assembly, and guiding the user or serviceman to execute maintenance work more accurately and reliably when the fault occurs in the unit assembly, thus realizing the embodiment such as optimizing the fault risk analysis system, increasing the product reliability, prolonging the product service life, and improving the user experience. Further, the system operation information acquired by the fault risk analysis system includes the following two types (1) and (2).

(1) the system operation information acquired by the fault risk analysis system is system operation information of the present unit assembly. The processor is configured to execute determining the influencing result of the fault inducing factor on the fault category according to the system operation information of the present unit assembly; and adjusting the risk level corresponding to the fault inducing factor and the fault risk level corresponding to the fault category, respectively, based on the influencing result.

When the system operation information acquired is the system operation information of the present unit assembly, such the system operation information may represent the operation status of the present unit assembly. For example, during operation of the air conditioner, a condenser temperature can directly reflect the working status of the current air conditioner.

During the operation of the system, as different operation statuses will cause different influences on the unit assembly, analysis of the system operation information of the present unit assembly can accurately determine the fault category of each fault inducing factor, which is like to occur in the present unit assembly, and can further analyze the influencing proportion of the fault inducing factor on the fault category, implementing the fault analysis on the actual influence on the unit assembly, to accurately locate the influence of each fault inducing factor on the unit assembly. Besides, corresponding adjustment of the fault risk level corresponding to the fault category based on the influencing result can minimize the adverse effect generated by the fault on the unit assembly, thus realizing the embodiment such as optimizing the fault risk analysis system, reducing the loss caused by the fault, improving the product reliability, and prolonging the product service life.

In a one embodiment, the operation information of the component corresponding to the fault category of which the risk level is changed is collected; a changing rate of the operation information is recorded for a period time of operation; in the case that the changing rate is low, it is determined that the fault inducing factor that causes the level to increase has a lower influence on this fault category, the level corresponding to such a fault category is decreased; in the case that the changing rate is high, it is determined that the fault inducing factor has a greater influence on this fault category, the risk level of this fault inducing factor is increased.

Further, the level is increased or decreased, that is, the fault level can be correspondingly adjusted according to the influencing coefficient of the fault inducing factor on the fault.

(2) The system operation information acquired by the fault risk analysis system is system fault information of other unit assembly.

When the system operation information acquired is the fault information of other unit assembly, such the fault information cannot reflect the working status of the present unit assembly, but can serve warning reference information for the present unit assembly. For example, when a large number of air conditioners are installed in a area, if the fault occurs in some air conditioners, the generated fault information can serve as the fault warning reference information for other air conditioners, to guide the user and the air conditioner system to reduce the occurrence probability of the fault.

The fault risk level of the fault category corresponding to the fault inducing factor is increased, to avoid the same fault from occurring in the present unit assembly as that in other unit assembly, thus avoiding the same fault from simultaneously occurring in multiple unit assemblies in the same area, thus realizing the embodiment such as improving the reliability of the fault risk system, achieving optimization of the fault risk analysis system, shortening the maintenance cost, and prolonging the product service life.

Further, the system operation information acquired is, but not limited by, the fault information of other unit assembly, may also be operation information of other unit assembly, serving as a reference, to improving the adaptability of the fault risk.

Further, an initial basic fault risk level library may be established based on historical statistical fault data. In one embodiment, the fault risk level of the unit assembly may be determined from the perspective of a component of the unit assembly, where the fault category is categorized according to the category of the component; and the fault risk level corresponding to the fault category is classified, any fault category corresponds to at least one fault inducing factor.

In this embodiment, the fault category is categorized based on the category of the component; the fault risk level corresponding to the fault category is classified; and each fault category corresponds to at least one fault inducing factor. As the fault category and the fault possibility corresponding to each component as well as the fault influence are different, classification of the fault risk level corresponding to the fault category based on collected component information can further improve the reliability and accuracy of the fault risk level in the system, thus realizing the embodiment such as improving the accuracy and reliability of the fault risk analysis method, and prolonging the product service time.

In one embodiment, the fault risk analysis system determines a fault rate of a specific component in each component category, to determine the fault risk ranking of the components.

For example, the air conditioner is provided with a valve body-type component. The valve body includes a one-way valve, a throttle valve, a four-way valve, and the like. The fault risk analysis system compares respective fault rates of the one-way valve, the throttle valve and the four-way valve in the historical record; ranks a descending order of individual fault rates of the one-way valve, the throttle valve and the four-way valve based on the comparison result, thus determining the fault rate ranking of the valve body-type components. When a refrigerant circulation fault caused by the valve body-type fault occurs in the air conditioner, the system may gradually check the specific valve body structure from one having a higher fault rate to another having a lower fault rate, accurately and quickly locating the fault valve body.

Further, the fault risk analysis system ranks the fault risk of the component based on the fault rates of the components corresponding to all categories of the component.

Continue the previous paragraph, the fault risk analysis system expands the fault risk investigation to all categories of the components and ranks the risk levels of all categories of the components, so that the fault risk analysis system can quickly locate the category of the component where the fault occurs when the unit assembly fails. For example, when the air conditioner is unable to provide cooling, the fault risk analysis system may determine from the risk level ranking based on the risk level ranking of the category of the component, as the possibility of the compressor generating fault is greater than the possibility of the valve body generating fault, guiding the serviceman to check the compressor assembly first, and then check the valve body structure, thus reducing the maintenance difficulty.

Further, the fault risk analysis system may control the operation of the unit assembly before the fault occurs, thus avoiding the fault from occurring.

(1) The fault risk analysis system acquires the fault category for adjusting the fault risk level, and controls the system operation according to the control strategy corresponding to the fault inducing factor at the highest risk level in all fault inducing factors corresponding to the fault category.

By controlling the unit assembly to execute the strategy operation corresponding to the fault inducing factor at the highest risk level, the fault risk analysis system can minimize the occurrence possibility of such a fault, achieving the fault prevention, effectively reducing the fault occurrence probability, thus realizing the embodiment such as optimizing the fault risk analysis system function, improving the system reliability, reducing the product fault rate, and prolonging the product service life.

(2) The fault risk analysis system sends the prompt message based on the real-time system operation parameter of the present unit assembly exceeding the rated threshold range.

The fault risk analysis system sends the prompt message, to inform the user that the unit assembly is in the unconventional operation status, to warn the user the fault possibility of the unit assembly, to remind the user to shut down and check whether the fault occurs in the unit assembly, thus realizing the embodiment such as intellectual warning of the unit assembly, improving the reliability of the fault risk analysis system, reducing the product fault rate, and improving the user experience.

In one embodiment, the fault risk category includes: the compressor-type fault, the fan-type fault, the valve body-type fault, the sensor-type fault, and the electronic control component-type fault. Each unit assembly includes at least one of the above fault types. The descending order of the above-mentioned multiple fault categories is: the sensor-type fault—the electronic control component-type fault—the valve body-type fault—the fan-type fault—the compressor-type fault. Such a ranking is applicable to most conventional unit assemblies, and can guide the unit assembly to effectively warn the fault during operation, and accurately evaluate the fault of the unit assembly after the unit assembly fails.

Figure 2:
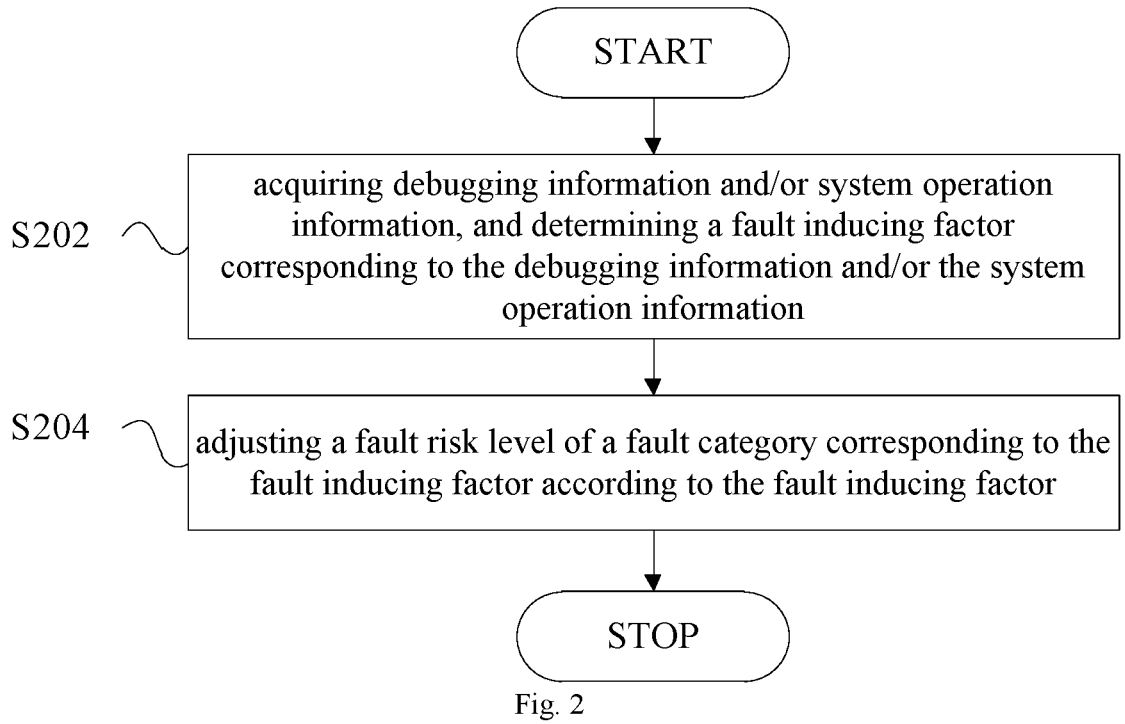
FIG. 2 is a flow chart showing a fault risk analysis method according to an embodiment of the present disclosure.

An embodiment of the preset disclosure provides a fault risk analysis method, as shown in FIG. 2, the procedure of the fault risk analysis method includes S202 and S204.

At S202, debugging information and/or system operation information are acquired, and a fault inducing factor corresponding to the debugging information and/or the system operation information is determined.

At S204, a fault risk level of a fault category corresponding to the fault inducing factor is adjusted according to the fault inducing factor.

In this embodiment, the fault risk analysis system defined in the present disclosure is applied in an air conditioner. During installation of the air conditioner, the device debugging information of the air conditioner is input into the fault risk system, the system operation information and the working parameter of the air conditioner are then acquired in real-time during the operation, to determine the potential safety hazard and the fault inducing factor of the air conditioner in advance, and evaluate the fault risk level.

Collection of the debugging information can accurately reflect the potential fault inducing factor of the current unit assembly, thus achieving fault warning that is accurate to each unit assembly itself. Analysis of the fault inducing factor based on the collected system operation information can further optimize the process of analyzing the fault inducing factor of the unit assembly on the basis of analysis of the fault inducing factor based on the debugging information, thus allowing the fault inducing factor determined by the fault risk analysis system to be more acute and reliable, as well as applicable to the current unit assembly, thus realizing the embodiment such as optimizing the product fault analysis mechanism, increasing the reliability and accuracy of the fault analysis, improving the warning reliability of the product fault, accurately guiding the user to reduce the occurrence probability of the product fault, and improving the user experience.

An embodiment of the present disclosure provides a fault risk analysis method, which further includes: adjusting the risk level corresponding to the fault inducing factor corresponding to the debugging information.

In this embodiment, after completion of production, the unit assembly will be attached with a default set of risk level ranking of the risk fault inducing factors, which represent induction possibilities that cause the unit assembly to fail. On this basis, the risk level corresponding to the fault inducing factor is correspondingly adjusted based on the collected debugging information, thus increasing the accuracy and reliability of the risk level corresponding to the fault inducing factor, allowing the adjusted risk level to be more applicable to the current unit assembly, improving the reliability of the fault warning of the unit assembly, and guiding the user or serviceman to execute maintenance work more accurately and reliably when the fault occurs in the unit assembly, thus realizing the embodiment such as increasing the product reliability, prolonging the product service life, and improving the user experience.

An embodiment of the present disclosure provides a fault risk analysis method. Based on acquiring the system operation information which is system operation information of a present unit assembly, the step of adjusting a fault risk level of a fault category corresponding to the fault inducing factor according to the fault inducing factor includes: determining an influencing result of the fault inducing factor on the fault category according to the system operation information of the present unit assembly; and adjusting a risk level corresponding to the fault inducing factor and the fault risk level corresponding to the fault category, respectively, based on the influencing result. In this embodiment, when the acquired system operation information is the system operation information of the present unit assembly, such the system operation information may represent the operation status of the present unit assembly. For example, during the operation of the air conditioner, a condenser temperature may directly reflect the working status of the current air conditioner.

During the operation of the system, as different operation statuses will cause different influences on the unit assembly, analysis of the system operation information of the present unit assembly can accurately determine the fault category of each fault inducing factor, which is like to occur in the present unit assembly, and can further analyze the influencing proportion of the fault inducing factor on the fault category, implementing the fault analysis on the actual influence on the unit assembly, to accurately locate the influence of each fault inducing factor on the unit assembly. Besides, corresponding adjustment of the fault risk level corresponding to the fault category based on the influencing result can minimize the adverse effect generated by the fault on the unit assembly, thus realizing the embodiment such as optimizing the fault risk analysis system, reducing the loss caused by the fault, improving the product reliability, and prolonging the product service life.

An embodiment of the present disclosure provides a fault risk analysis method. Based on acquiring the system operation information which is system fault information of other unit assembly, the step of adjusting a fault risk level of a fault category corresponding to the fault inducing factor according to the fault inducing factor includes: increasing the fault risk level of the fault category corresponding to the fault inducing factor.

In this embodiment, when the system operation information acquired is the fault information of other unit assembly, such the fault information cannot reflect the working status of the present unit assembly, but can serve warning reference information for the present unit assembly. For example, when a large number of air conditioners are installed in a area, if the fault occurs in some air conditioners, the generated fault information can serve as the fault warning reference information for other air conditioners, to guide the user and the air conditioner system to reduce the occurrence probability of the fault.

The fault risk level of the fault category corresponding to the fault inducing factor is increased, to avoid the same fault from occurring in the present unit assembly as that in other unit assembly, thus avoiding the same fault from simultaneously occurring in multiple unit assemblies in the same area, thus realizing the embodiment such as improving the reliability of the fault risk system, achieving optimization of the fault risk analysis system, shortening the maintenance cost, and prolonging the product service life.

Figure 3:
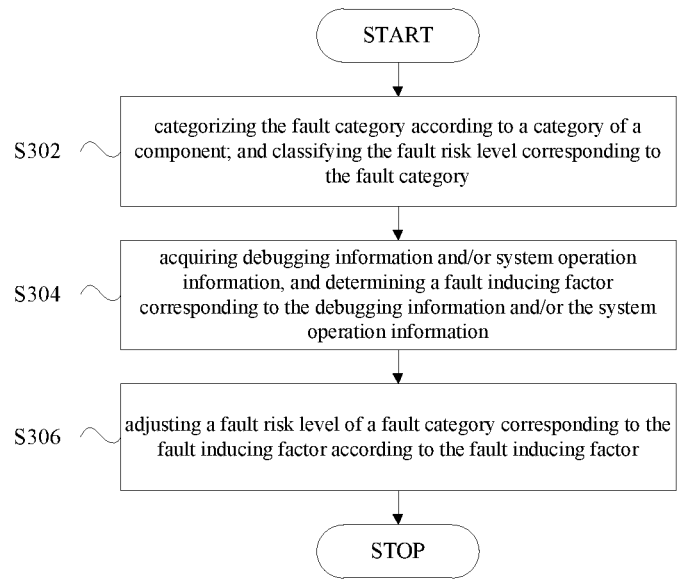
FIG. 3 is a flow chart showing a fault risk analysis method according to another embodiment of the present disclosure.

An embodiment of the present disclosure provides a fault risk analysis method, as shown in FIG. 3, the procedure of the fault risk analysis method includes S302 to S306.

At S302, the fault category is categorized according to a category of a component; and the fault risk level corresponding to the fault category is classified.

At S304, debugging information and/or system operation information are acquired, and a fault inducing factor corresponding to the debugging information and/or the system operation information is determined.

At S306, a fault risk level of a fault category corresponding to the fault inducing factor is adjusted according to the fault inducing factor.

In this embodiment, the fault category is categorized according to the category of the component; and the fault risk level corresponding to the fault category is classified; and each fault category corresponds to at least one fault inducing factor. The unit assemblies having different functions are provided with different corresponding devices and components, and the fault category and the fault possibility corresponding to each component as well as the fault influence are different, thus classification of the fault risk level corresponding to the fault category based on the collected component information can further improve the reliability and accuracy of the fault risk level in the system, excluding the fault category absent in the present unit assembly on one hand; and increasing the reference value for improving the fault risk level on the other hand, thus realizing the embodiment such as improving the accuracy and reliability of the fault risk analysis method, and prolonging the product service life.

Figure 4:
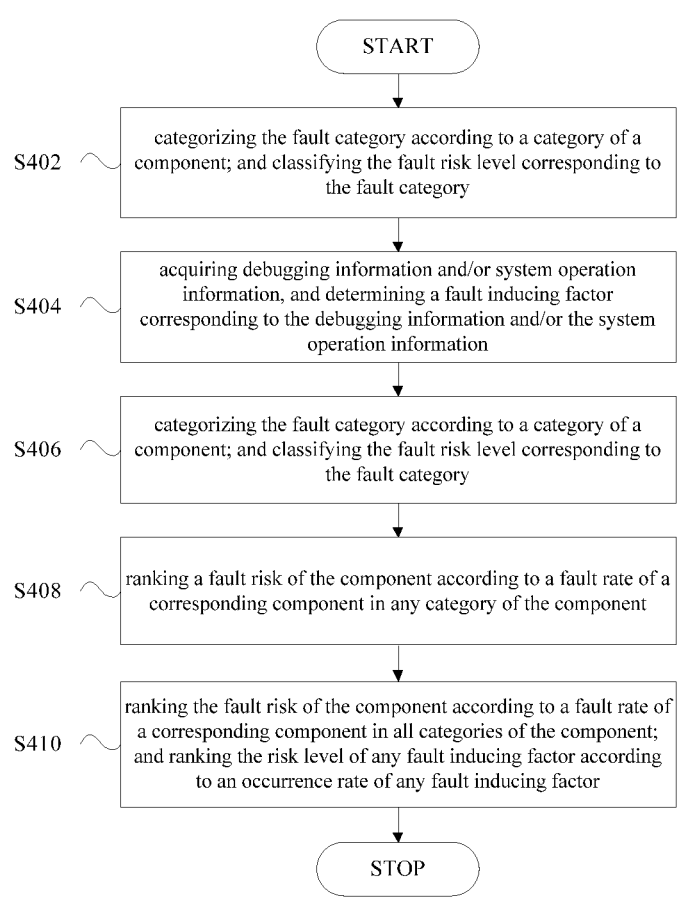
FIG. 4 is a flow chart showing a fault risk analysis method according to still another embodiment of the present disclosure.

An embodiment of the present disclosure provides a fault risk analysis method, as shown in FIG. 4, including S402 to S410.

At S402, the fault category is categorized according to a category of a component; and the fault risk level corresponding to the fault category is classified.

At S404, debugging information and/or system operation information are acquired, and a fault inducing factor corresponding to the debugging information and/or the system operation information is determined.

At S406, a fault risk level of a fault category corresponding to the fault inducing factor is adjusted according to the fault inducing factor.

At S408, a fault risk of the component is ranked according to a fault rate of a corresponding component in any category of the component.

At S410, the fault risk of the component is ranked according to a fault rate of a corresponding component in all categories of the components; and the risk level of any fault inducing factor is ranked according to an occurrence rate of any fault inducing factor.

In this embodiment, the fault risk analysis method may determine the fault risk level of the unit assembly from the perspective of a component of the unit assembly.

(1) The fault risk analysis method determines a fault rate of a specific component in each component category, to determine the fault risk ranking of the components.

For example, the air conditioner is provided with a valve body-type component. The valve body includes a one-way valve, a throttle valve, a four-way valve, and the like. During operation, the fault risk analysis method compares respective fault rates of the one-way valve, the throttle valve and the four-way valve in the historical record; ranks a descending order of individual fault rates of the one-way valve, the throttle valve and the four-way valve based on the comparison result, thus determining the fault rate ranking of the valve body-type components. When a refrigerant circulation fault caused by the valve body-type fault occurs in the air conditioner, the method may gradually check the specific valve body structure from one having a higher fault rate to another having a lower fault rate, accurately and quickly locating the fault valve body.

(2) The fault risk analysis method ranks the fault risk of the component based on the fault rates of the components corresponding to all categories of the component.

Continue the previous paragraph, the fault risk analysis method expands the fault risk investigation to all categories of the components and ranks the risk levels of all categories of the components, so that the fault risk analysis method can quickly locate the category of the component where the fault occurs when the unit assembly fails. For example, when the air conditioner is unable to provide cooling, the fault risk analysis method may determine from the risk level ranking based on the risk level ranking of the category of the component, as the possibility of the compressor generating fault is greater than the possibility of the valve body generating fault, guiding the serviceman to check the compressor assembly first, and then check the valve body structure, thus reducing the maintenance difficulty.

Therefore, on one hand, the fault category absent in the present unit assembly is excluded; and on the other hand, the reference value of the fault risk level is increased, thus realizing the embodiment such as optimizing the fault risk analysis method, improving the accuracy and reliability of the fault risk analysis method, and prolonging the product service life.

Figure 5:
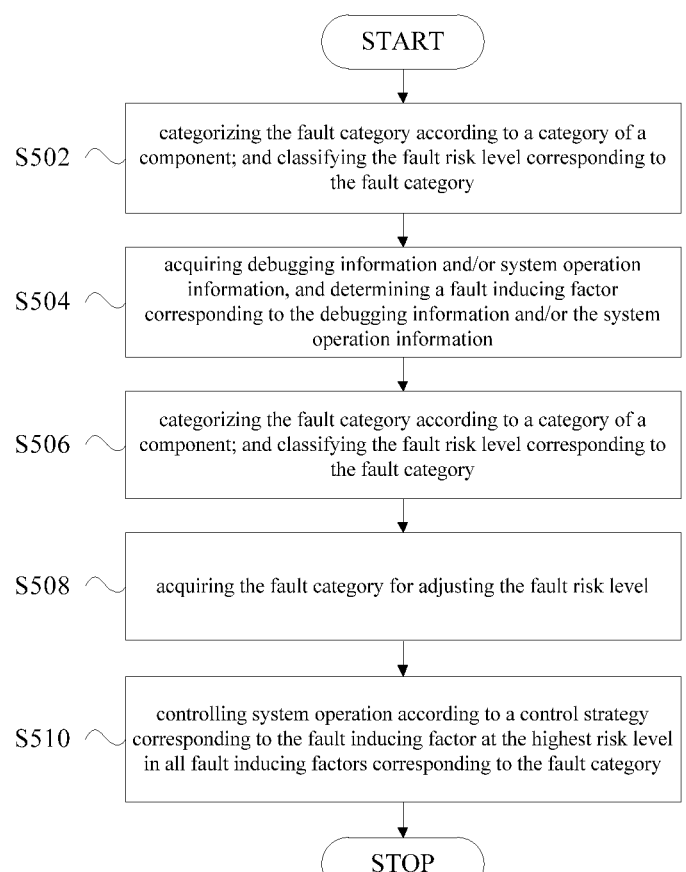
FIG. 5 is a flow chart showing a fault risk analysis method according to yet another embodiment of the present disclosure.

An embodiment of the present disclosure provides a fault risk analysis method, as shown in FIG. 5, the procedural of the fault risk analysis method includes S502 to S510.

At S502, the fault category is categorized according to a category of a component; and the fault risk level corresponding to the fault category is classified.

At S504, debugging information and/or system operation information are acquired, and a fault inducing factor corresponding to the debugging information and/or the system operation information is determined.

At S506, a fault risk level of a fault category corresponding to the fault inducing factor is adjusted according to the fault inducing factor.

At S508, the fault category for adjusting the fault risk level is acquired.

At S510, the system operation is controlled according to a control strategy corresponding to the fault inducing factor at the highest risk level in all fault inducing factors corresponding to the fault category.

In this embodiment, the fault risk analysis method acquires the fault category for adjusting the fault risk level, and controls the system operation according to the control strategy corresponding to the fault inducing factor at the highest risk level in all fault inducing factors corresponding to the fault category.

By controlling the unit assembly to execute the strategy operation corresponding to the fault inducing factor at the highest risk level, the fault risk analysis method can minimize the occurrence possibility of such a fault, achieving the fault prevention, effectively reducing the fault occurrence probability, thus realizing the embodiment such as optimizing the product function, improving the product reliability, reducing the product fault rate, and prolonging the product service life.

Figure 6:
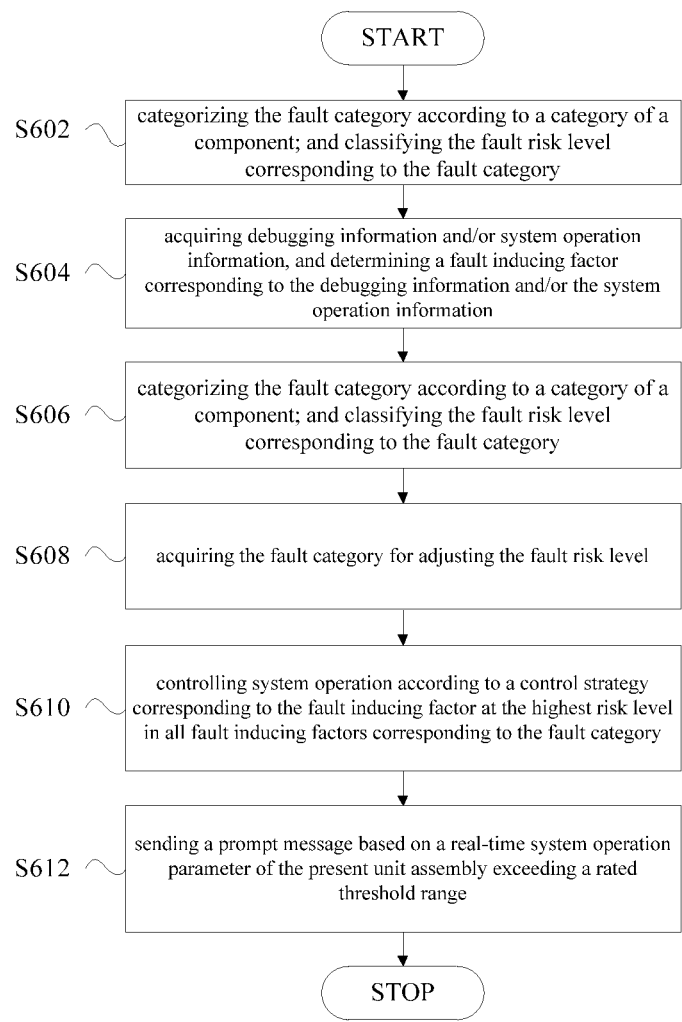
FIG. 6 is a flow chart showing a fault risk analysis method according to yet another embodiment of the present disclosure.

An embodiment of the present disclosure provides a fault risk analysis method, as shown in FIG. 6, the procedure of the fault risk analysis method includes S602 to S612.

At S602, the fault category is categorized according to a category of a component; and the fault risk level corresponding to the fault category is classified.

At S604, debugging information and/or system operation information are acquired, and a fault inducing factor corresponding to the debugging information and/or the system operation information is determined.

At S606, a fault risk level of a fault category corresponding to the fault inducing factor is adjusted according to the fault inducing factor.

At S608, the fault category for adjusting the fault risk level is acquired.

At S610, the system operation is controlled according to a control strategy corresponding to the fault inducing factor at the highest risk level in all fault inducing factors corresponding to the fault category.

At S612, a prompt message is sent based on a real-time system operation parameter of the present unit assembly exceeding a rated threshold range.

In this embodiment, the fault risk analysis method sends the prompt message based on the real-time system operation parameter of the present unit assembly exceeding the rated threshold range. By controlling the unit assembly to send the prompt message, the fault risk analysis method informs the user that the unit assembly is in the unconventional operation status, warns the user of the fault possibility of the unit assembly, and reminds the user to shut down and check whether the fault occurs in the unit assembly, realizing the embodiment such as the intellectual warning of the unit assembly, improving the reliability of the fault risk analysis method, reducing the product fault rate, and improving the user experience.

Figure 7:
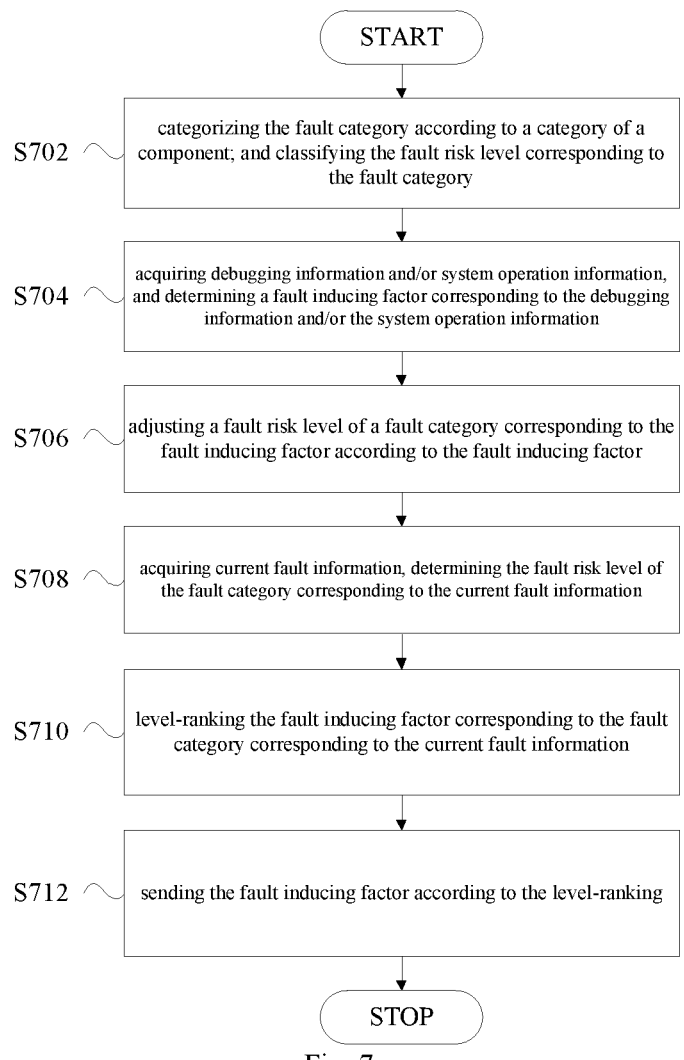
FIG. 7 is a flow chart showing a fault risk analysis method according to yet another embodiment of the present disclosure.

An embodiment of the present disclosure provides a fault risk analysis method, as shown in FIG. 7, the procedure of the fault risk analysis method includes S702 to S712.

At S702, the fault category is categorized according to a category of a component; and the fault risk level corresponding to the fault category is classified.

At S704, debugging information and/or system operation information are acquired, and a fault inducing factor corresponding to the debugging information and/or the system operation information is determined.

At S706, a fault risk level of a fault category corresponding to the fault inducing factor is adjusted according to the fault inducing factor.

At S708, current fault information is acquired, and the fault risk level of the fault category corresponding to the current fault information is determined.

At S710, the fault inducing factor corresponding to the fault category corresponding to the current fault information is level-ranked.

At S712, the fault inducing factor is sent according to the level-ranking.

In this embodiment, the current fault information is acquired, and the fault risk level of the fault category corresponding to the current fault information is determined; and the fault inducing factor corresponding to the fault category is level-ranked, and the fault inducing factor is sent according to the ranking result. Collection of the fault information can accurately determine the fault category, to assist the serviceman to narrow the troubleshooting range. The fault inducing factor corresponding to the fault category is sent in a level-ranked form, enabling the user to determine the possibilities of various fault inducing factors by the level-ranking, assisting the user to accurately locate the fault category and the fault inducing factor of the unit assembly, reducing the maintenance difficulty and cost for the unit assembly, thus realizing the embodiment such as increasing the product reliability, improving the product intellectual degree, and reducing the product maintenance difficulty.

In one embodiment, the fault risk category includes: the compressor-type fault, the fan-type fault, the valve body-type fault, the sensor-type fault, and the electronic control component-type fault. Each unit assembly includes at least one of the above fault types. The descending order of the above-mentioned multiple fault categories is: the sensor-type fault—the electronic control component-type fault—the valve body-type fault—the fan-type fault—the compressor-type fault. Such a ranking is applicable to most conventional unit assemblies, and can guide the unit assembly to effectively warn the fault during operation, and accurately evaluate the fault of the unit assembly after the unit assembly fails.

An embodiment of the present disclosure provides an air conditioner, including the fault risk analysis system as described in any of the above embodiments. Therefore, the air conditioner has all advantages of the fault risk analysis system provided in any of the above embodiments, which will not be repeated hereby.

An embodiment of the present disclosure provides a computer readable storage medium having stored therein a computer program that when executed by a processor implements the fault risk analysis method as described in any of the above embodiments. Therefore, the air conditioner has all advantages of the fault risk analysis method provided in any of the above embodiments, which will not be repeated hereby.

Figure 8:
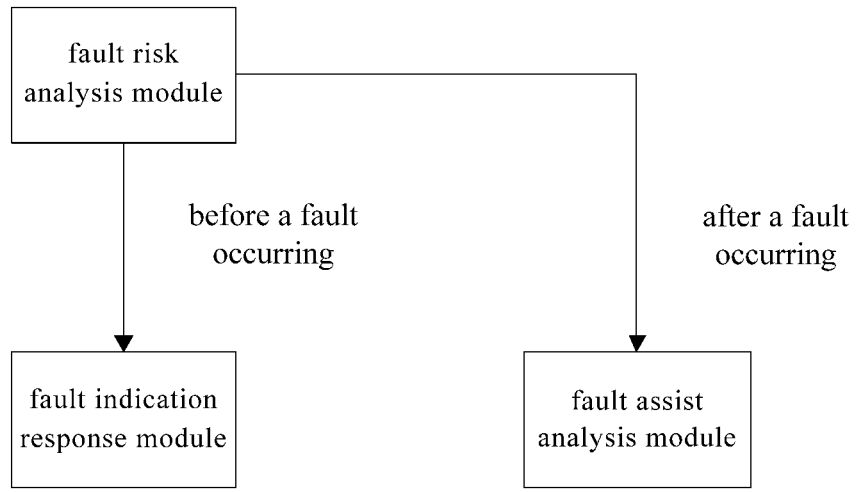
FIG. 8 is a system block diagram showing a fault risk analysis system according to an embodiment of the present disclosure.

As shown in FIG. 8, the fault risk analysis system includes three basic devices: a fault risk analysis device, a fault indication response device, and a fault assist analysis device. The three devices may operate separately, or establish a communicating mechanism there between for collaborative operation. It is not necessary to include all of the three basic devices, but the fault risk analysis device is at least required, and other two devices may be included. The devices may be, but not limited to, arranged in a main controller of the machine itself, or may be arranged in a cloud data processing center.

Figure 9:
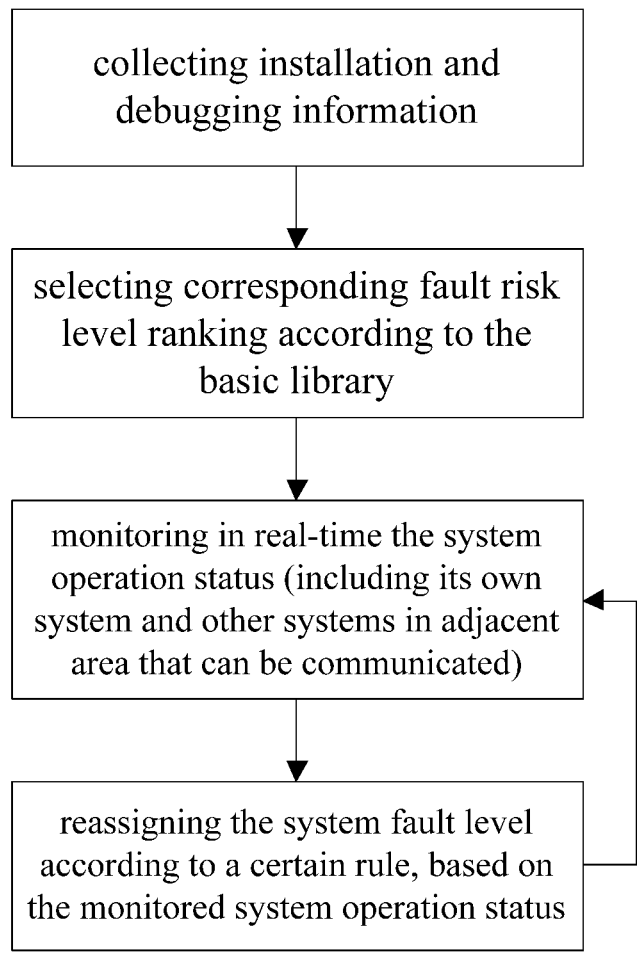
FIG. 9 is a working diagram showing a fault analysis device according to an embodiment of the present disclosure.

(1) As to the Fault Risk Analysis Device, as Shown in FIG. 9

Its function lies in ranking the fault risk of the unit assembly in accordance to a rule based on the collected information during installation, initial debugging and real-time operation of the unit assembly (including but not limited to information about the operation parameter and the operation fault of the present unit assembly; being capably of acquiring, in different communicating ways, the information about the operation parameter and the operation fault of the unit assembly installed adjacently), to guide the unit assembly to adjust the operation strategy or guide the future maintenance of the unit assembly.

In one embodiments, at the initial design of the unit assembly, a basic fault risk level library is built for the fault risk analysis device based on historical fault data, where the faults may be classified into major categories based on components, such as the compressor-type fault, the fan-type fault, the valve body-type fault, the sensor-type fault, the electronic control component-type fault, and the like, but is not limited hereto. Besides, based on the experience value at the initial design of the unit assembly, the fault risk levels of different component categories are ranked, and at the same time, the fault risk levels of the components within each category of the component are also ranked, where the one at the top of ranking is considered to be at a higher risk level.

The risk levels in the basic fault risk level library are classified by the major categories: the sensor-type fault>the electronic control component-type fault>the valve body-type fault>the fan-type fault>the compressor-type fault.

Besides, different sub-categories of the risk levels may be set for each major category according to different actual system. Taking the sensor-type fault as an example, the indoor pipe temperature sensor>the outdoor unit pipe temperature sensor>the outdoor unit room temperature sensor>the indoor unit room temperature sensor.

Such a categorizing way is only an example, in the overall risk level ranking, sub-categories is allowed to belong different major categories in a crossing manner according to the actual condition. For example, the indoor pipe temperature sensor fault, the outdoor pipe temperature sensor fault and the outdoor room temperature sensor fault belong to the sensor-type fault, which is ranked at the top by the main category; while the risk of the indoor unit room temperature sensor is ranked behind the electronic control component-type fault.

Beside, each fault has a corresponding fault inducing factor library, i.e., one fault corresponds to fault inducing factors, that is fault inducing factors is likely to cause the fault to occur. For example, a large drop may induce a compressor oil return fault, which is one inducing factor of the compressor-type fault.

The formulation of the ranking rule for the basic fault risk level library depends on different aspects such as the product design experience accumulation and the product design margin, which are not limited herein and stored in the fault risk analysis device at the initial use of product.

Figure 10:
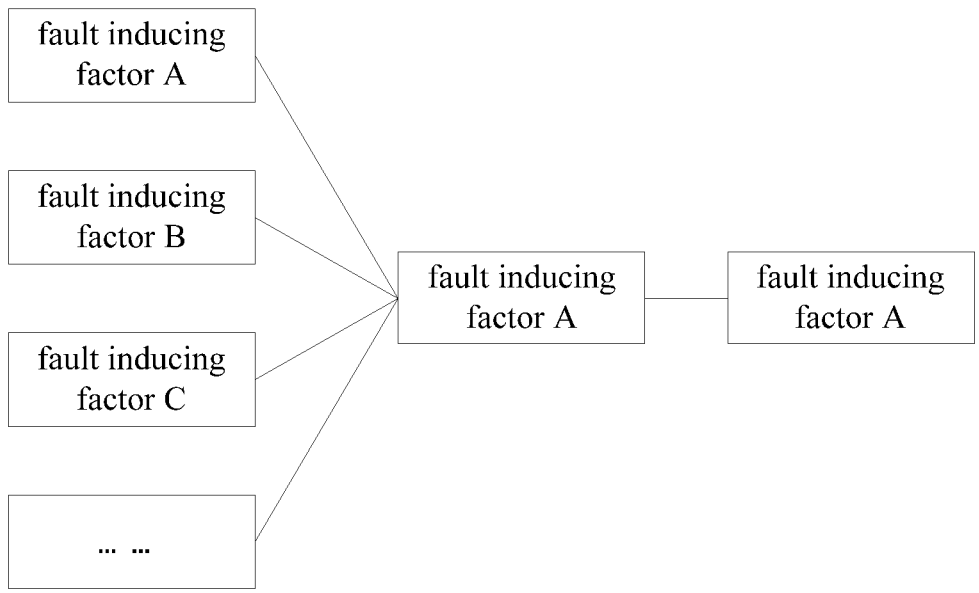
FIG. 10 shows a corresponding relationship diagram between a fault inducing factor, a fault category and a fault risk level according to an embodiment of the present disclosure.

The fault inducing factor, the fault category, and the fault risk level constitute the fault risk level library (including the basic library and the current library), where their correspondence relationship is shown in FIG. 10.

Different fault inducing factors may have different impact factors on the fault risk level, where the ranking of the factors will determine its decisive effect on the increasing or decreasing the fault risk level. The impact factor may be determined as a value based on experience, or adjusted in real time based on the actual operating condition. If a fault occurring in multiple systems is caused by a fault inducing factor, the impact factor of the current inducing factor is increased.

When the product is delivered for use, the fault risk analysis device receives the product installation and debugging information, retrieves the information in the basic fault risk level library, and forms the current fault risk level library according to a rule. The rule is to analyze the information obtained during the existing installation and debugging, to match with the information in the fault inducing factor library, and to increase the risk level of the fault category, corresponding to the inducing factor found in the installation and debugging, in the current fault risk level library.

The part of the installation and debugging information that the unit assembly has not obtained will be determined or not processed based on the subsequent operation of the unit assembly. For example, the installation drop information is required to be manually entered at the initial installation of the unit assembly, but the unit assembly may determine the installation drop information if not entered by the installation personnel, or will not take the installation drop information into account temporarily.

Specific Embodiment 1 of the Fault Risk Analysis Device

The basic fault risk level library is assigned to the current fault risk level library for the initial unit assembly from factory. The risk level of the compressor-type fault is the lowest (i.e., level 1), and the risk level of the electrical control component-type fault is level 4. However, during the installation and debugging, the fault inducing factors are collected: the pipe diameter of the outdoor unit installation pipe is one size smaller, and the outdoor heat exchanger is poor in heat dissipation.

Because of one size smaller of the pipe diameter, the impact factor is increased by one risk level for the compressor-type fault.

Because of the poor heat dissipation of the outdoor heat exchanger, the impact factor is increased by one risk level respectively for the compressor-type fault and for the electronic control component-type fault.

In accordance with the influence by the impact factor, the current fault risk level library is updated, where the risk level of the compressor-type fault is changed to 3, and the risk level of the electronic control component-type fault is changed to 5.

Specific Embodiment 2 of the Fault Risk Analysis Device

Based on the previous fault risk level library, where the risk level of the compressor-type fault is changed to 3, and the risk level of the electronic control component-type fault is changed to 5.

During operation, it is found by monitoring the system parameter that the climate environment and the load demand, under which the system actually operates, cause the influence of the poor heat dissipation of the outdoor heat exchanger to be reduced on the compressor-type fault, but to be maintained on the electronic control component-type fault. For example, the system can maintain operation in the normal ranges of the high and low pressure and the exhaust temperature, but the temperature of the electronic control device is continuously maintained at a high level.

At this time according to determination that the impact factor is increased by one risk level for the compressor-type fault due to the poor heat dissipation of the outdoor heat exchanger, the risk level of the compressor-type fault is decreased by one risk level, that is, the influence of such a fault inducing factor on the compressor-type fault is cancelled. Accordingly, the risk level of the compressor-type fault is changed to level 2.

The risk level of the electronic control component-type fault is maintained to be unchanged at level 5.

Specific Embodiment 3 of the Fault Risk Analysis Device

Based on the previous fault risk level library, where the risk level of the compressor-type fault is changed to 2, and the risk level of the electronic control component-type fault is changed to 5.

During operation, the compressor-type fault occurred in other system, which has the same horsepower, combined with adjacent compressor and installed in the same area, is collected.

For the fault occurring in other machine in the same area, according to the rule assigned by the system, the risk level of the corresponding fault will be directly increased by two levels, which is not allowed to decrease here (the rule may be but is not limited to this one).

At this time, accordingly, the risk level of the compressor-type fault is changed to level 4.

Figure 11:
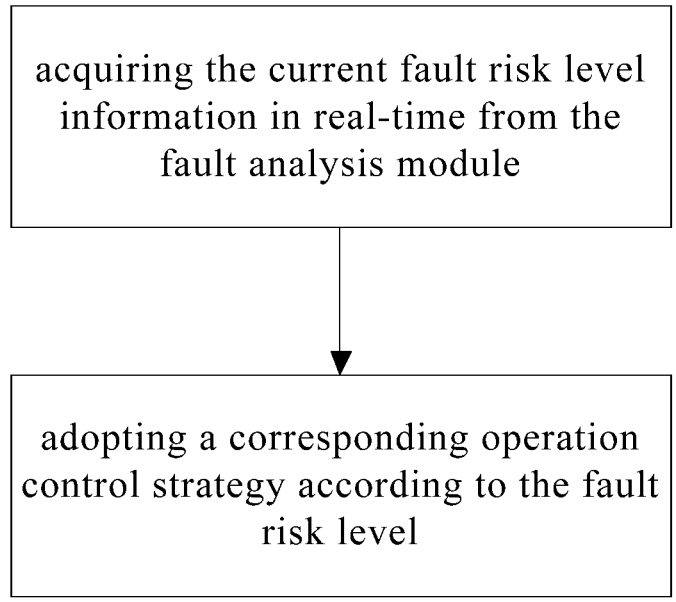
FIG. 11 is a working schematic diagram of a fault indication response device according to an embodiment of the present disclosure.

(2) As to the Fault Indication Response Device, as Shown in FIG. 11.

The fault risk analysis device collects information of the current fault risk level library. As to the fault at a higher risk level in the library, the system adopts a corresponding control strategy within the range allowed by system reliability (or in the case that the short-term overload operation is allowed when receiving a corresponding instruction), to ensure that the influence of the current fault at the higher risk level on the system can be reduced, preventing the fault at the high risk level from occurring.

In one embodiment, the air conditioner operates based on the current fault risk level library initially, where the basic library is called, and the air conditioner operates according to the general normal control. With the operation of the air conditioner, the current fault risk level library is changed, for example, the compressor-type fault risk level is increased, and the fault inducing factor causing the risk level of the compressor-type fault to increase is determined by consultation as long-term operation of the compressor under over-high high-pressure status.

At this time, the unit assembly may adopt a strategy of increasing the highest wind-level, based on classification of the current operating wind-levels at the high-pressure side, to control the high pressure of the system.

Further, if the pressure still cannot be decreased after the wind-level is increased, the system can send the user or serviceman a prompt message to check whether the heat exchange condition of the heat exchanger at the high-pressure side of the air conditioner is deteriorated, such as serious dust deposition on the heat exchanger, addition foreign object blocking, and etc.

Figure 12:
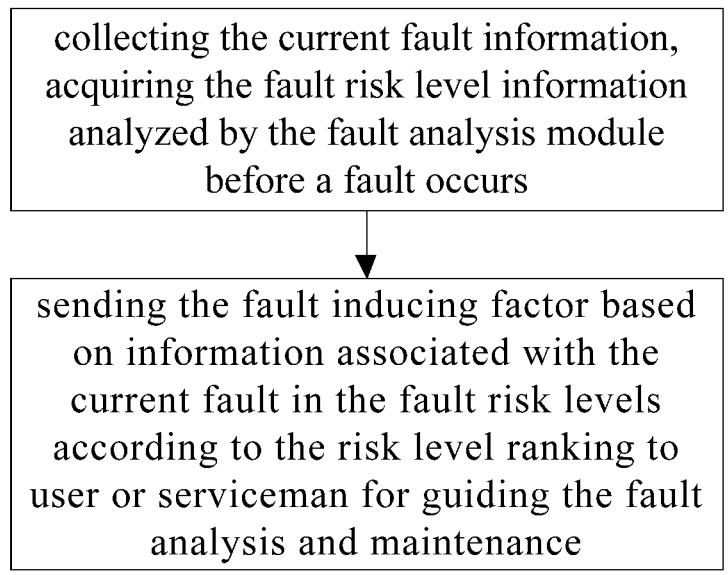
FIG. 12 is a working schematic diagram of a fault asset analysis device according to an embodiment of the present disclosure.

(3) As to the Fault Assist Analysis Device, as Shown in FIG. 12

After a fault occurs in the air conditioner, the system may call information in the current fault risk level library, and analyze the fault inducing factor. The fault inducing factor that had occurred and caused the current fault risk level to increase is sent to the user or serviceman according to the ranking of the impact factors, for guiding the fault analysis and maintenance.

Specific Embodiment 1 of the Fault Assist Analysis Device

After a fault occurs in the air conditioner, the information of the current fault risk level library is called. For example, the compressor-type fault occurs in the air conditioner at this time, the current risk level of the compressor-type fault is level 3, which is up-leveled by two levels compared to the level 5 in the basic fault risk level library. The inducing factor causing the up-leveling is that the compressor is in a long-term status where the exhaust temperature is over high and the pressure is over high.

Such information is preferential sent to the user or serviceman, suggesting the user or serviceman to preferential check whether the refrigerant charge of the system is appropriate and whether the valve body part is blocked.

Specific Embodiment 2 of the Fault Assist Analysis Device

After a fault occurs in the air conditioner, the information of the current fault risk level library is called. For example, the compressor-type fault occurs in the air conditioner at this time, the current risk level of the compressor-type fault is level 5, which is same as the level 5 in the basic fault risk level library.

The inducing factors in the compressor-type fault inducing factor library is analyzed one-by-one, in accordance with an analyzing principle of referring to the operation information before the fault occurs in the system (such as the installation and debugging information collected during the installation stage, and the user habit during the use state) and different inducing factors corresponding to different impact factors. For example, the outdoor unit is installed in a well-ventilated environment, the impact factor by the inducing factor by the poor heat dissipation of the outdoor heat exchanger is decreased.

It is found that the system has been running under low-load and low-frequency for a long time, where the impact factor by the inducing factor of the long-term low-load operation is at the top of the ranking.

Therefore, it is preferential to send the analyzed user habit to the user or serviceman, to guide analysis of compressor fault reason.

In the present disclosure, the term "a plurality of" refers to two or more than two, unless defined otherwise. The terms "install", "connect", "couple", "fix" and the like should be understood in a broad sense. For example, "connect" may be a fixed connection, a detachable connection, or an integral connection. "connect" may be direct connection or indirect connection through an intermediary. The specific meanings of the above-mentioned terms in the present disclosure can be understood according to specific circumstances.

In the description of this specification, the terms "one embodiment", "some embodiments", "specific embodiments", etc. mean that specific features, structures, materials or characteristics described in conjunction with the embodiment or examples are included in at least one embodiment or example of the present disclosure. In this specification, the illustrative expressions of the above-mentioned terms do not necessarily refer to the same embodiment or example. Moreover, the described specific features, structures, materials or characteristics may be combined in any one or more embodiments or examples in a suitable manner.

What is claimed is:

1. A fault risk analysis system of a central air conditioning unit, comprising:
    a memory for storing a computer program;
    a processor configured to execute the computer program to implement:
    acquiring debugging information and system operation information of the central air conditioning unit;
    acquiring system fault information of other central air conditioning units of same brand as the central air conditioning unit, wherein the other central air conditioning units and the central air conditioning unit are located in same area;
    determining a fault inducing factor corresponding to the debugging information and the system operation information;
    determining fault risk level of components of the central air conditioning unit according to detected fault rates of components of other central air conditioning units; and
    adjusting the fault risk level of the central air conditioning unit according to the fault inducing factor and the fault risk level of the components of the central air conditioning unit, wherein the processor is further configured to execute the computer program to implement:
    controlling system operation according to a control strategy corresponding to the fault inducing factor at the highest risk level in all fault inducing factors corresponding to a fault category.

2. The fault risk analysis system according to claim 1, wherein the processor is further configured to execute the computer program to implement:
    adjusting a risk level corresponding to the fault inducing factor corresponding to the debugging information.

3. The fault risk analysis system according to claim 1, wherein
    based on acquiring the system operation information which is system operation information of a present central air conditioning unit, the processor is configured to execute the step of adjusting a fault risk level of the fault category corresponding to the fault inducing factor according to the fault inducing factor by:
    determining an influencing result of the fault inducing factor on the fault category according to the system operation information of the present central air conditioning unit; and
    adjusting a risk level corresponding to the fault inducing factor and the fault risk level corresponding to the fault category, respectively, based on the influencing result.

4. The fault risk analysis system according to claim 3, wherein
    based on acquiring the system operation information which is system fault information of other central air conditioning unit, the processor is configured to execute the step of adjusting a fault risk level of a fault category corresponding to the fault inducing factor according to the fault inducing factor by:

increasing the fault risk level of the fault category corresponding to the fault inducing factor.

5. The fault risk analysis system according to claim 1, wherein the processor is further configured to execute the computer program to implement:
   categorizing the fault category according to a category of a component; and
   classifying the fault risk level corresponding to the fault category,
   wherein any fault category corresponds to at least one fault inducing factor.

6. The fault risk analysis system according to claim 5, wherein the processor is further configured to execute the computer program to implement:
   ranking a fault risk of the component according to a fault rate of a corresponding component in any category of the component;
   ranking the fault risk of the component according to a fault rate of a corresponding component in all categories of the component; and
   ranking the fault risk level of any fault inducing factor according to an occurrence rate of any fault inducing factor.

7. The fault risk analysis system according to claim 5, wherein the processor is further configured to execute the computer program to implement:
   acquiring the fault category for adjusting the fault risk level.

8. The fault risk analysis system according to claim 7, wherein the processor is further configured to execute the computer program to implement:
   sending a prompt message based on a real-time system operation parameter of the present central air conditioning unit exceeding a rated threshold range.

9. The fault risk analysis system according to claim 5, wherein the processor is further configured to execute the computer program to implement:
   acquiring current fault information, determining the fault risk level of the fault category corresponding to the current fault information;
   level-ranking the fault inducing factor corresponding to the fault category corresponding to the current fault information; and
   sending the fault inducing factor according to the level-ranking.

10. The fault risk analysis system according to claim 5, wherein
    the fault risk category comprises at least one of a compressor-type fault, a fan-type fault, a valve body-type fault, a sensor-type fault, and an electronic control component-type fault; and
    the fault risk levels of the sensor-type fault, the electronic control component-type fault, the valve body-type fault, the fan-type fault, and the compressor-type fault decrease in sequence.

11. An air conditioner, comprising a fault risk analysis system according to claim 1.

12. A fault risk analysis method of a central air conditioning unit, comprising:
    acquiring debugging information and system operation information of the central air conditioning unit;
    acquiring system fault information of other central air conditioning units of same brand as the central air conditioning unit, wherein the other central air conditioning units and the central air conditioning unit are located in same area;
    determining a fault inducing factor corresponding to the debugging information and the system operation information;
    determining fault risk level of components of the central air conditioning unit according to detected fault rates of components of other central air conditioning units; and
    adjusting the fault risk level of the central air conditioning unit according to the fault inducing factor and the fault risk level of the components of the central air conditioning unit, wherein the processor is further configured to execute the computer program to implement:
    controlling system operation according to a control strategy corresponding to the fault inducing factor at the highest risk level in all fault inducing factors corresponding to a fault category.

13. The fault risk analysis method according to claim 12, further comprising:
    adjusting a risk level corresponding to the fault inducing factor corresponding to the debugging information.

14. The fault risk analysis method according to claim 12, wherein
    based on acquiring the system operation information which is system operation information of a present central air conditioning unit, the step of adjusting a fault risk level of the fault category corresponding to the fault inducing factor according to the fault inducing factor comprises:
    determining an influencing result of the fault inducing factor on the fault category according to the system operation information of the present central air conditioning unit; and
    adjusting a risk level corresponding to the fault inducing factor and the fault risk level corresponding to the fault category, respectively, based on the influencing result.

15. The fault risk analysis method according to claim 14, wherein
    based on acquiring the system operation information which is system fault information of other central air conditioning unit, the step of adjusting a fault risk level of a fault category corresponding to the fault inducing factor according to the fault inducing factor comprises:
    increasing the fault risk level of the fault category corresponding to the fault inducing factor.

16. The fault risk analysis method according to claim 12, further comprising:
    categorizing the fault category according to a category of a component; and
    classifying the fault risk level corresponding to the fault category,
    wherein any fault category corresponds to at least one fault inducing factor.

17. The fault risk analysis method according to claim 16, further comprising:
    ranking a fault risk of the component according to a fault rate of a corresponding component in any category of the component;
    ranking the fault risk of the component according to a fault rate of a corresponding component in all categories of the component; and
    ranking the fault risk level of any fault inducing factor according to an occurrence rate of any fault inducing factor.

18. The fault risk analysis method according to claim 16, further comprising:
    acquiring the fault category for adjusting the fault risk level; and controlling system operation according to a control strategy corresponding to the fault inducing factor at the highest risk level in all fault inducing factors corresponding to the fault category.

19. The fault risk analysis method according to claim 18, further comprising:
sending a prompt message based on a real-time system operation parameter of the present central air conditioning unit exceeding a rated threshold range.

20. The fault risk analysis method according to claim 16, further comprising:
acquiring current fault information, determining the fault risk level of the fault category corresponding to the current fault information;
level-ranking the fault inducing factor corresponding to the fault category corresponding to the current fault information; and
sending the fault inducing factor according to the level-ranking.

21. The fault risk analysis method according to claim 16, wherein
the fault risk category comprises at least one of a compressor-type fault, a fan-type fault, a valve body-type fault, a sensor-type fault, and an electronic control component-type fault; and
the fault risk levels of the sensor-type fault, the electronic control component-type fault, the valve body-type fault, the fan-type fault, and the compressor-type fault decrease in sequence.

22. A non-transitory computer readable storage medium having stored therein a computer program that when executed by a processor implements a fault risk analysis method according to claim 12.

* * * * *